(No Model.)
H. A. PARCELLS.
SHUFFLE HOE.
No. 568,143. Patented Sept. 22, 1896.
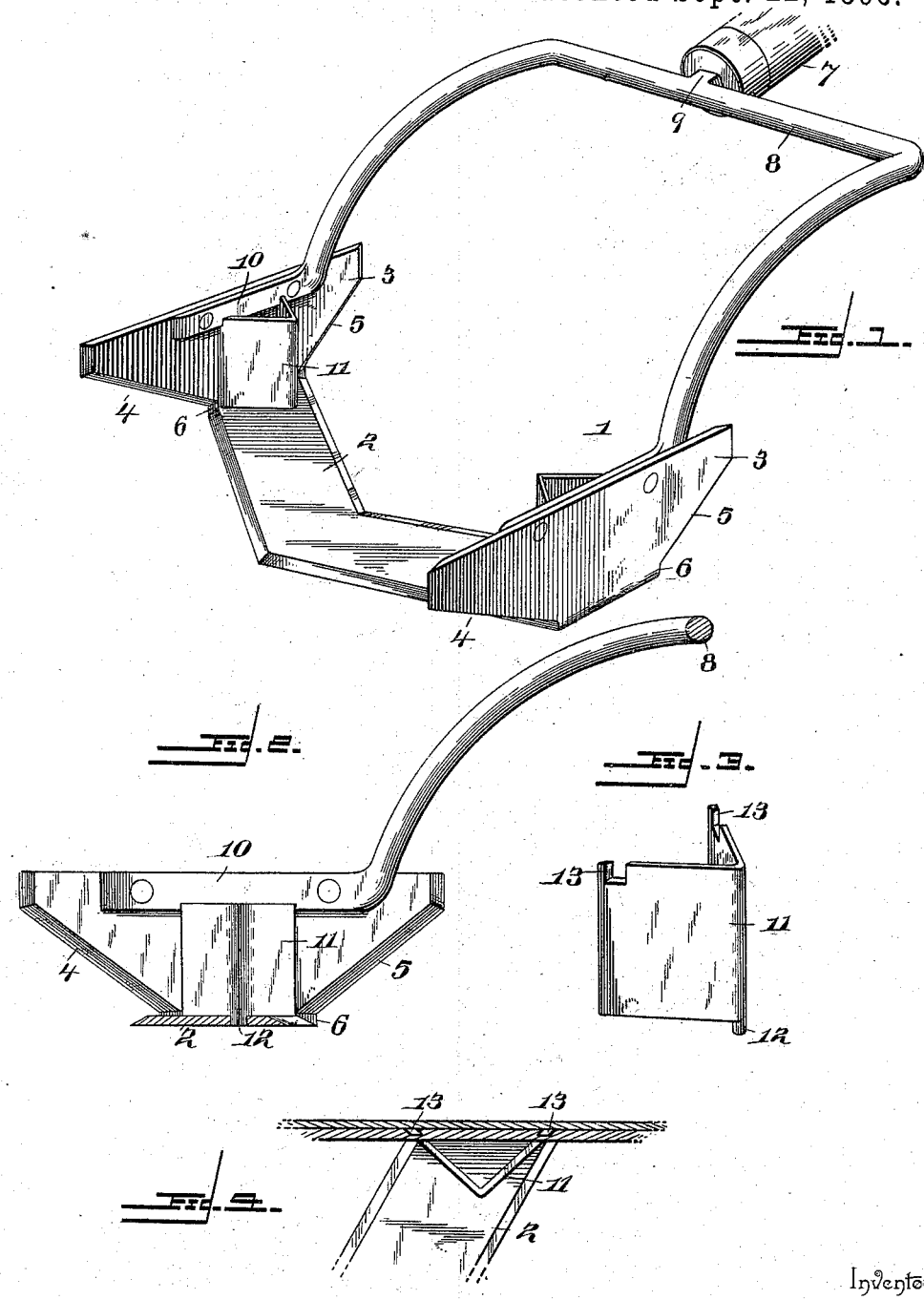
Witnesses
Inventor
Henry A. Parcells.
By his Attorneys,
C. A. Snow & Co.

UNITED STATES PATENT OFFICE.

HENRY A. PARCELLS, OF DELTA, COLORADO.

SHUFFLE-HOE.

SPECIFICATION forming part of Letters Patent No. 568,143, dated September 22, 1896.

Application filed November 19, 1895. Serial No. 569,450. (No model.)

*To all whom it may concern:*

Be it known that I, HENRY A. PARCELLS, a citizen of the United States, residing at Delta, in the county of Delta and State of Colorado, have invented a new and useful Shuffle-Hoe, of which the following is a specification.

The invention relates to improvements in shuffle-hoes.

The object of the present invention is to improve the construction of shuffle-hoes, more especially the hoe forming the subject-matter of Patent No. 543,266, granted me July 23, 1895.

A further object of the invention is to enable such a hoe to work easier by lessening the resistance and to provide means for removing some of the soil from certain kinds of crops that require such a treatment during their growth. In growing onions from seed it is noticeable that the first bulbs to mature are those that set on top of the ground, while those disposed in the soil are the last to ripen. It is one of the most difficult parts of onion culture to remove the soil around the neck of the plant at that particular time; and it is another object of the invention to provide a device which will enable such soil to be properly and rapidly removed without injuring the plant and which will afford a guide to the eye of the operator, permitting him actually to touch the plant without injuring it.

A further object of the invention is to open a small trench or furrow for the application of a chemical fertilizer, if desired.

The invention consists in the construction and novel combination and arrangement of parts hereinafter fully described, illustrated in the accompanying drawings, and pointed out in the claims hereto appended.

In the drawings, Figure 1 is a perspective view of a shuffling-hoe constructed in accordance with this invention. Fig. 2 is a longitudinal sectional view. Fig. 3 is a detail perspective view of one of the V-shaped soil-deflectors.

Like numerals of reference designate corresponding parts in all the figures of the drawings.

1 designates a shuffling-hoe comprising a horizontal blade 2 and parallel wings 3, located at the ends of the blade and extending longitudinally of the hoe and disposed vertically. The blade and wings may be constructed of a single piece of metal or may be made separate and suitably secured together, and the blade is substantially V-shaped, diverging rearwardly similar to that shown in the patent above referred to. The upper surface of the blade is beveled at the front and rear edges to form cutting edges, which are arranged diagonally to the line of operation, so as to produce a shearing action on roots and weeds. The wings or sides 3 project in front and in rear of the cutting-blade, being provided with lower oppositely-inclined cutting edges 4 and 5. The resistance offered to the hoe by the soil is decreased by locating the blade 2 below the body portion of the wings, the latter being connected with the ends of the blade by narrow depending extensions 6, and the extensions 6 will vary in length according to the size of the instrument. The front and rear edges of the depending extensions are beveled to form cutting edges, which are continuations of the inclined edges 4 and 5, and the ends of the wings are similarly beveled to provide cutting edges. The wings are connected with a handle 7 by a forked shank 8, curved in side elevation and provided with a central integral tang 9, which is inserted in the handle. The sides of the fork are provided with horizontal extensions or attachment-plates 10, which are suitably secured to the inner faces of the wings at the upper edges thereof.

In growing onions from seed it is noticeable that the first bulbs to mature are those that set on top of the ground, while those deepest in the soil are the last to ripen. It is one of the most difficult parts of onion culture to remove the soil around the neck of the plant at that particular time, and to enable this operation to be properly and rapidly performed without injuring the plant the hoe is provided at opposite sides, on the inner faces of the wings, with vertically-disposed soil-deflectors 11, preferably V-shaped in horizontal section and presenting angularly-disposed faces converging from the inner faces of the wings, whereby the deflectors are adapted to throw the soil toward the center of the blade away from the wings when the hoe is moved either forward or rearward. Each wing serves as a guide to the eye of the operator, permitting him actually to touch the plant without injuring it, and a small trench or furrow is opened to enable a chemical fertilizer to be readily applied to the plants, if desired. Each deflector is provided at its bottom with a depending stud 12, located at the apex and secured in a perforation of the blade, and each side of the deflector is provided at its top, adjacent to the wing, with upwardly-projecting lugs 13, which are interposed between the side of the fork and the wing. By this means the soil-deflecting devices are firmly interlocked with the horizontal cutting-blade and the sides of the fork and are securely mounted on the hoe.

It will be seen that the hoe is easy to operate, that the resistance offered to it by the soil is decreased to a minimum, and that it is adapted to throw soil away from plants to expose the plant to facilitate an easy application of fertilizer.

Changes in the form, proportion, and minor details of construction may be resorted to without departing from the principle or sacrificing any advantages of the invention.

What I claim is—

1. A shuffle-hoe comprising a cutting-blade and side wings, and provided with a soil-deflector arranged adjacent to one of the wings and provided with oppositely-inclined faces converging from the wing, whereby the hoe is adapted to throw soil laterally away from the wing in both its forward and backward movement, substantially as described.

2. A shuffle-hoe, comprising a horizontal blade and side wings extending in front and in rear of the blade, and provided with narrow depending extensions 6, beveled and formed with cutting edges, and connected with the blade, whereby the latter is downwardly offset from the wings to decrease the resistance offered to the hoe by the soil, substantially as described.

3. A shuffle-hoe, comprising side wings, a blade connecting the wings, the substantially V-shaped soil-deflectors arranged at the inner faces of the wings and presenting front and rear angularly-disposed faces converging from the wings, and provided at their tops, adjacent to the wings, with lugs, and having lugs at their bottoms located at the apexes of the deflectors and secured in perforations of the blade, and a fork secured to the inner faces of the wings, and having the lugs interposed between it and the side wings, substantially as and for the purpose described.

4. A shuffle-hoe comprising a horizontal cutting-blade, a side wing extended beyond the front and rear edges of the cutting-blade, and a deflector of substantially the same width as the cutting-blade arranged vertically against the side wings, substantially as described.

5. A shuffle-hoe comprising a blade, a side wing extending beyond the front and rear edges of the cutting-blade, and the substantially V-shaped soil-deflector arranged at the inner face of the wing and presenting front and rear angularly-disposed faces converging from the wing, substantially as and for the purpose described.

6. A shuffle-hoe comprising a horizontal cutting-blade, side wings extending beyond the front and rear edges of the cutting-blade, a fork secured to the inner faces of the side wings, and deflectors arranged on the cutting-blade and interlocked at their bottoms with the same and located adjacent to the side wings and interlocked at their tops with the said fork, substantially as described.

In testimony that I claim the foregoing as my own I have hereto affixed my signature in the presence of two witnesses.

HENRY A. PARCELLS.

Witnesses:
T. S. BEARDSLEY,
N. I. SLEWING.